US012695116B2

(12) United States Patent
Kambara et al.

(10) Patent No.: US 12,695,116 B2
(45) Date of Patent: Jul. 28, 2026

(54) PRODUCTION METHOD FOR SOLID ELECTROLYTE AND ELECTROLYTE PRECURSOR

(71) Applicant: IDEMITSU KOSAN CO., LTD., Tokyo (JP)

(72) Inventors: Takayoshi Kambara, Chiba (JP); Nobuhito Nakaya, Ichihara (JP); Hiroaki Yamada, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 772 days.

(21) Appl. No.: 17/633,997

(22) PCT Filed: Sep. 9, 2020

(86) PCT No.: PCT/JP2020/034105
§ 371 (c)(1),
(2) Date: Feb. 9, 2022

(87) PCT Pub. No.: WO2021/054220
PCT Pub. Date: Mar. 25, 2021

(65) Prior Publication Data
US 2022/0294008 A1 Sep. 15, 2022

(30) Foreign Application Priority Data

Sep. 17, 2019 (JP) ................................. 2019-168332

(51) Int. Cl.
H01M 10/0562 (2010.01)
C01B 25/14 (2006.01)
(Continued)

(52) U.S. Cl.
CPC ......... H01M 10/0562 (2013.01); C01B 25/14 (2013.01); C03C 3/323 (2013.01);
(Continued)

(58) Field of Classification Search
None
See application file for complete search history.

(56) References Cited

U.S. PATENT DOCUMENTS

2013/0295469 A1* 11/2013 Liang .................. H01M 10/056
977/734
2015/0017536 A1* 1/2015 Abe ...................... H01M 4/502
429/223
(Continued)

FOREIGN PATENT DOCUMENTS

CN 109088092 A 12/2018
CN 109643790 A 4/2019
(Continued)

OTHER PUBLICATIONS

Propylene glycol monomethyl ether acetate, IPCS INCHEM Home, Sep. 1997 (Year: 1997).*
(Continued)

*Primary Examiner* — Mary Grace Harris
(74) *Attorney, Agent, or Firm* — Element IP, PLC

(57) ABSTRACT

The present invention provides a production method of a solid electrolyte containing a lithium element, a sulfur element, a phosphorous element, and a halogen element, wherein the solid electrolyte has a high ionic conductivity and capable of suppressing hydrogen sulfide by adopting a liquid-phase method, wherein the method includes mixing a complexing agent having an ester group and also having at least one branch with a solid electrolyte raw material. The present invention also relates to an electrolyte precursor.

18 Claims, 5 Drawing Sheets

(Embodiment A)

( Embodiment B)

(51) Int. Cl.

| | | |
|---|---|---|
| *C03C 3/32* | (2006.01) |
| *C03C 4/14* | (2006.01) |
| *C03C 4/18* | (2006.01) |
| *C03C 10/00* | (2006.01) |
| *C03C 10/16* | (2006.01) |
| *H01B 1/06* | (2006.01) |
| *H01B 1/10* | (2006.01) |
| *H01B 13/00* | (2006.01) |
| *H01M 10/052* | (2010.01) |

(52) U.S. Cl.

CPC .................. *C03C 4/14* (2013.01); *C03C 4/18* (2013.01); *C03C 10/00* (2013.01); *C03C 10/16* (2013.01); *H01B 1/06* (2013.01); *H01B 1/10* (2013.01); *H01B 13/00* (2013.01); *H01M 10/052* (2013.01); *C03C 2204/00* (2013.01); *H01M 2300/0068* (2013.01); *H01M 2300/008* (2013.01); *H01M 2300/0085* (2013.01); *Y02E 60/10* (2013.01)

(56) References Cited

U.S. PATENT DOCUMENTS

| | | | |
|---|---|---|---|
| 2016/0190635 A1* | 6/2016 | Oshitari ................ H01M 4/131 252/182.1 |
| 2017/0155170 A1* | 6/2017 | Sato ........................ C03C 10/00 |
| 2017/0162902 A1* | 6/2017 | Ohta ................. H01M 10/0562 |
| 2019/0190007 A1 | 6/2019 | Seong et al. |
| 2020/0220210 A1* | 7/2020 | Makino ............... H01M 10/058 |

FOREIGN PATENT DOCUMENTS

| | | | |
|---|---|---|---|
| CN | 110073536 A | 7/2019 |
| JP | H4-57823 A | 2/1992 |
| JP | 2010186744 A * | 8/2010 |
| JP | 2013179025 A | 9/2013 |
| JP | 2014191899 A | 10/2014 |
| JP | 2015005371 A | 1/2015 |
| JP | 2016117640 A | 6/2016 |
| JP | 2017100907 A | 6/2017 |
| JP | 2018088306 A | 6/2018 |
| JP | 2019057400 A | 4/2019 |
| JP | 2019067523 A | 4/2019 |
| JP | 2019124687 A | 7/2019 |
| JP | 2019145261 A | 8/2019 |
| KR | 20210136596 A * | 11/2021 | ........ H01M 10/0562 |
| WO | WO-2014192309 A1 | 12/2014 |
| WO | WO-2017159667 A1 | 9/2017 |
| WO | WO-2018054709 A1 | 3/2018 |
| WO | WO-2018110647 A1 | 6/2018 |

OTHER PUBLICATIONS

Machine English translation of JP2010186744A originally published to Ota Aug. 26, 2010 (Year: 2010).*

Machine English translation of KR-20210136596-A originally published to 정훈기 Nov. 17, 2021 (Year: 2021).*

International Search Report issued Nov. 17, 2020 in PCT/JP2020/034105 (with English translation), 5 pages.

Stefan J. Sedlmaier et al., "Li4PS4I: A Li+ Superionic Conductor Synthesized by a Solvent-Based Soft Chemistry Approach", Chemistry of Materials, 29, 2017, pp. 1830-1835.

Office Action issued Mar. 14, 2023 in Japanese Patent Application No. 2021-546632 (with English translation), 5 pages.

Japanese Office Action issued Sep. 19, 2023 in Patent Application No. 2021-546632 (with machine English translation), 3 pages.

Office Action issued Feb. 5, 2025, in Korean Patent Application No. 10-2022-7004480 (with English translation), 11 pages.

Combined Chinese Office Action and Search Report issued Mar. 12, 2025, in corresponding Chinese Patent Application No. 202080056967. 5, (with machine English translation), 18 pages.

Combined Chinese Office Action and Search Report issued Jun. 28, 2025, in corresponding Chinese Patent Application No. 202080056967. 5, (with machine English translation), 21 pages.

* cited by examiner

[Fig. 1]
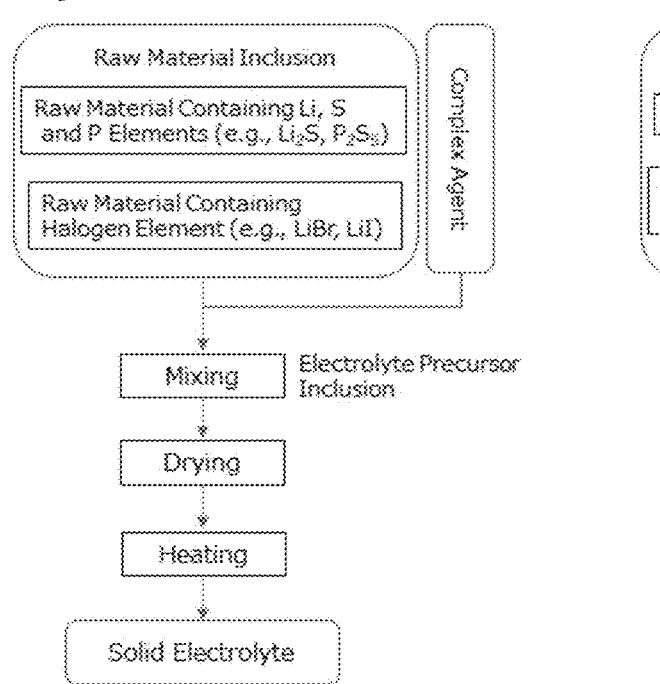
(Embodiment A)    ( Embodiment B)
[Fig. 2]
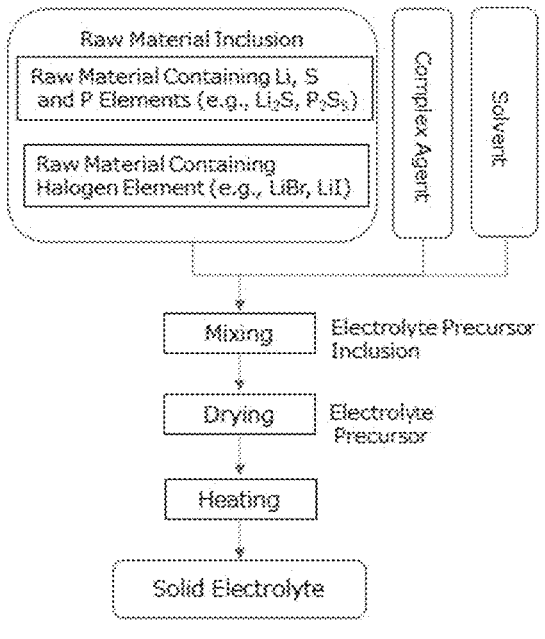
( Embodiment C)    ( Embodiment D)

[Fig. 3]
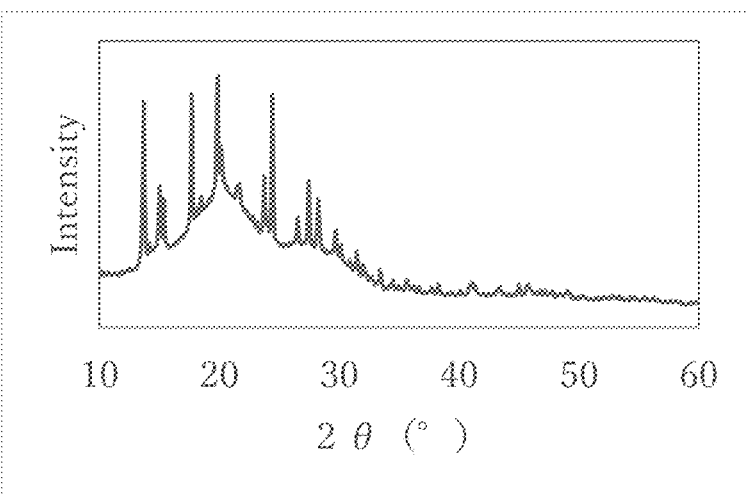
[Fig. 4]
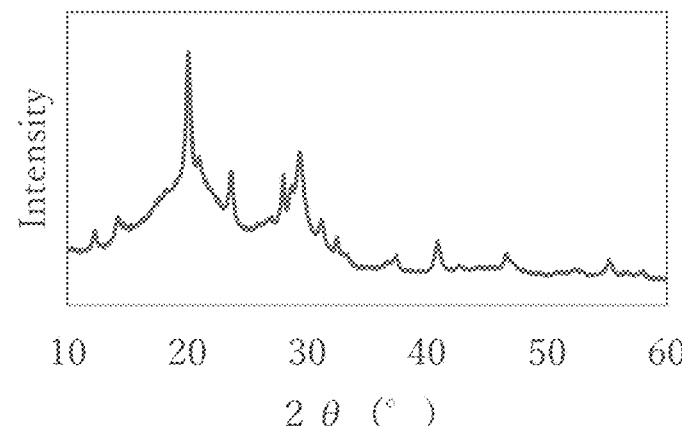
[Fig. 5]
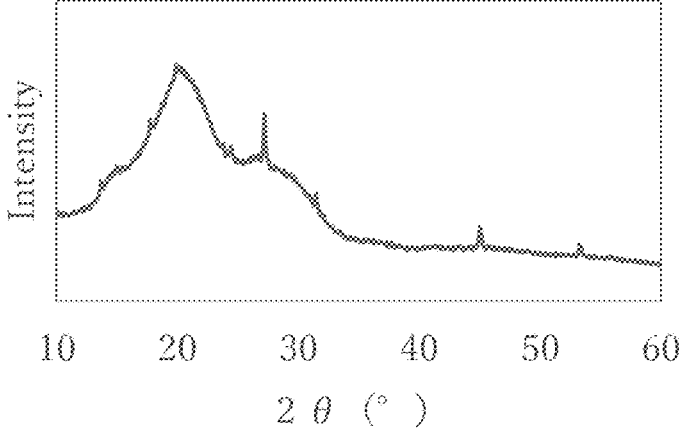

[Fig. 6]
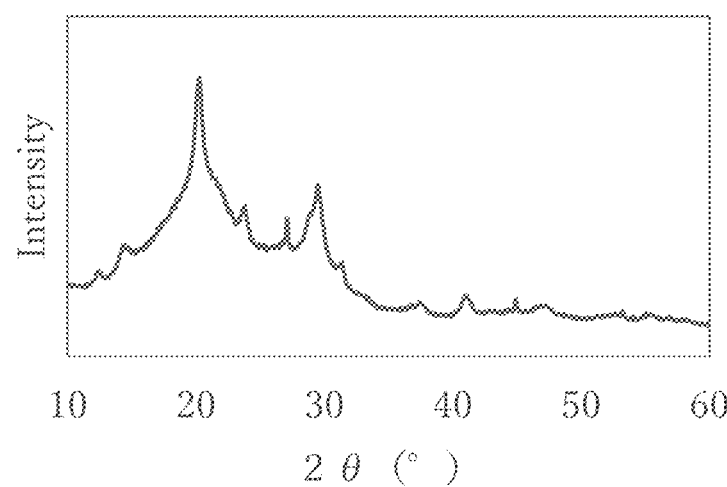
[Fig. 7]
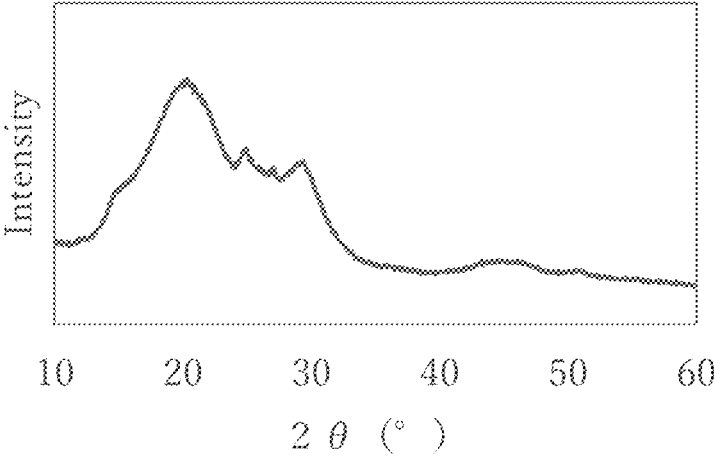

[Fig. 8]
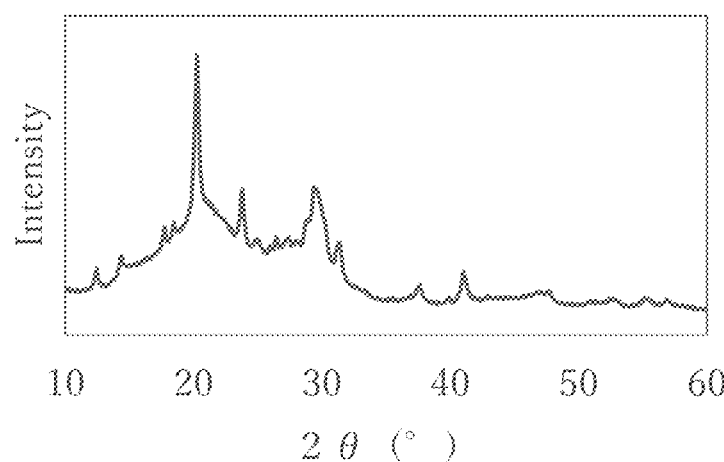
$2\theta$ (°)
[Fig. 9]
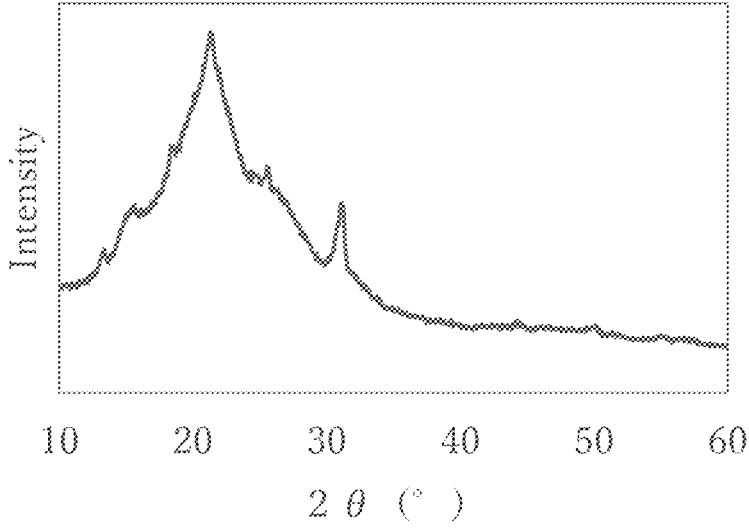
$2\theta$ (°)

[Fig. 10]
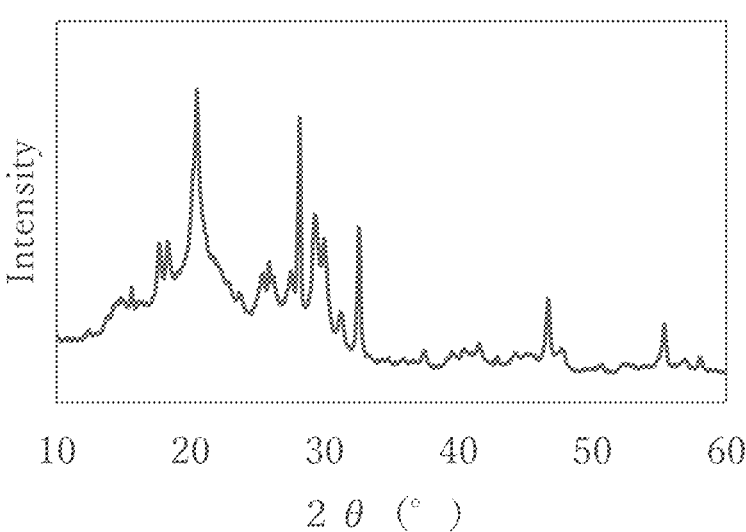

PRODUCTION METHOD FOR SOLID ELECTROLYTE AND ELECTROLYTE PRECURSOR

TECHNICAL FIELD

The present invention relates to a method for producing a solid electrolyte and an electrolyte precursor.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

A production method of a solid electrolyte to be used for a solid electrolyte layer is roughly classified into a solid-phase method and a liquid-phase method. Furthermore, as for the liquid-phase method, there are a homogeneous method in which a solid electrolyte material is completely dissolved in a solvent; and a heterogeneous method in which a solid electrolyte material is not completely dissolved in a solvent but undergoes through a suspension of solid-liquid coexistence. For example, as the solid-phase method, a method in which raw materials, such as lithium sulfide and diphosphorus pentasulfide are subjected to mechanical milling treatment using an apparatus, such as a ball mill and a bead mill and optionally subjected to heat treatment, thereby producing an amorphous or crystalline solid electrolyte is known (see, for example, PTL 1). In accordance with this method, the solid electrolyte is obtained by applying a mechanical stress to the raw materials, such as lithium sulfide, to promote the reaction of the solids with each other.

On the other hand, as for the homogenous method regarding the liquid-phase method, a method in which a solid electrolyte is dissolved in a solvent and redeposited is known (see, for example, PTL 2). In addition, as for the heterogeneous method, a method in which a solid electrolyte raw material, such as lithium sulfide, is allowed to react in a solvent containing a polar aprotic solvent is known (see, for example, PTLs 3 and 4 and NPL 1). For example, PTL 4 discloses that a production method of a solid electrolyte having an $Li_4PS_4I$ structure includes a step in which dimethoxyethane (DME) is used and bound with an $Li_3PS_4$ structure, to obtain $Li_3PS_4 \cdot DME$. The obtained solid electrolyte has an ionic conductivity of $5.5 \times 10^{-5}$ S/cm ($3.9 \times 10^{-4}$ S/cm in the calcium-doped product). Toward practical use of an all-solid-state battery, the liquid-phase method is recently watched as a method in which it can be synthesized simply and in a large amount in addition to versatility and applicability.

CITATION LIST

Patent Literature

PTL 1: WO 2017/159667 A
PTL 2: JP 2014-191899 A

PTL 3: WO 2014/192309 A
PTL 4: WO 2018/054709 A

Non-Patent Literature

NPL 1: CHEMISTRY OF MATERIALS, 2017, No. 29, pp. 1830-1835

SUMMARY OF INVENTION

Technical Problem

However, as for the conventional solid-phase method accompanied with mechanical milling treatment or the like, the solid-phase reaction is the center, and the solid electrolyte is readily obtained in a high purity, and thus, a high ionic conductivity can be realized. On the other hand, as for the liquid-phase method, for the reasons that the solid electrolyte is dissolved, and thus, decomposition, breakage, or the like of a part of the solid electrolyte components is generated during deposition, it was difficult to realize a high ionic conductivity as compared with the solid-phase synthesis method.

For example, according to the homogenous method, the raw materials or the solid electrolyte is once completely dissolved, and thus, the components can be homogenously dispersed in the liquid. But, in the subsequent deposition step, the deposition proceeds according to an inherent solubility of each of the components, and thus, it is extremely difficult to perform the deposition while keeping the dispersed state of the components. As a result, each of the components is separated and deposited. In addition, according to the homogenous method, an affinity between the solvent and lithium becomes excessively strong, and therefore, even by drying after deposition, the solvent hardly comes out. For these matters, the homogenous method involves such a problem that the ionic conductivity of the solid electrolyte is largely lowered.

In addition, even in the heterogeneous method of solid-liquid coexistence, a part of the solid electrolyte is dissolved, and thus, separation takes place owing to elution of the specified component, so that it is difficult to obtain a desired solid electrolyte.

In view of the aforementioned circumstances, the present invention has been made, and an object thereof is to provide a production method for obtaining a solid electrolyte having a high ionic conductivity by adopting a liquid-phase method; and an electrolyte precursor.

Solution to Problem

In order to solve the aforementioned problem, the present inventors made extensive and intensive investigations. As a result, it has been found that the foregoing problem can be solved by the following inventions.

1. A production method of a solid electrolyte containing a lithium element, a sulfur element, a phosphorous element, and a halogen element, the method including mixing a complexing agent having an ester group and also having at least one branch with a solid electrolyte raw material.
2. An electrolyte precursor constituted of a lithium element, a sulfur element, a phosphorous element, a halogen element, and a complexing agent having an ester group and also having at least one branch.

Advantageous Effects of Invention

In accordance with the present invention, it is possible to provide a solid electrolyte having a high ionic conductivity and an electrolyte precursor by adopting a liquid-phase method.

BRIEF DESCRIPTION OF DRAWINGS

FIG. 1 is a flow chart of explaining one example of preferred modes of a production method of the present embodiment.

FIG. 2 is a flow chart of explaining one example of preferred modes of the production method of the present embodiment.

FIG. 3 is an X-ray diffraction spectrum of an electrolyte precursor obtained in Example 1.

FIG. 4 is an X-ray diffraction spectrum of a crystalline solid electrolyte obtained in Example 1.

FIG. 5 is an X-ray diffraction spectrum of an electrolyte precursor obtained in Example 2.

FIG. 6 is an X-ray diffraction spectrum of a crystalline solid electrolyte obtained in Example 2.

FIG. 7 is an X-ray diffraction spectrum of an electrolyte precursor obtained in Example 3.

FIG. 8 is an X-ray diffraction spectrum of a crystalline solid electrolyte obtained in Example 3.

FIG. 9 is an X-ray diffraction spectrum of a fixed substance obtained in Comparative Example 1.

FIG. 10 is an X-ray diffraction spectrum of a powder obtained in Comparative Example 2.

DESCRIPTION OF EMBODIMENTS

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

Production Method of Solid Electrolyte

A production method of a solid electrolyte of the present embodiment is a production method of a solid electrolyte containing a lithium element, a sulfur element, a phosphorous element, and a halogen element, the method including mixing a complexing agent having an ester group and also having at least one branch with a solid electrolyte raw material.

The "solid electrolyte" as referred to in this specification means an electrolyte of keeping the solid state at 25° C. in a nitrogen atmosphere. The solid electrolyte in the present embodiment is a solid electrolyte containing a lithium element, a sulfur element, a phosphorus element, and a halogen element and having an ionic conductivity to be caused owing to the lithium element.

In the "solid electrolyte", both of a crystalline solid electrolyte having a crystal structure and an amorphous solid electrolyte, which are obtained by the production method of the present embodiment, are included. The crystalline solid electrolyte as referred to in this specification is a material that is a solid electrolyte in which peaks derived from the solid electrolyte are observed in an X-ray diffraction pattern in the X-ray diffractometry, and the presence or absence of peaks derived from the raw materials of the solid electrolyte does not matter. That is, the crystalline solid electrolyte contains a crystal structure derived from the solid electrolyte, in which a part thereof may be a crystal structure derived from the solid electrolyte, or all of them may be a crystal structure derived from the solid electrolyte. The crystalline solid electrolyte may be a material in which an amorphous solid electrolyte is contained in a part thereof so long as it has the X-ray diffraction pattern as mentioned above. In consequence, in the crystalline solid electrolyte, a so-called glass ceramics which is obtained by heating the amorphous solid electrolyte to a crystallization temperature or higher is contained.

The amorphous solid electrolyte as referred to in this specification is one having a halo pattern in which other peak than the peaks derived from the materials is not substantially observed in an X-ray diffraction pattern in the X-ray diffractometry, and it is meant that the presence or absence of peaks derived from the raw materials of the solid electrolyte does not matter.

The solid electrolyte raw material which is used in the production method of a solid electrolyte of the present embodiment is preferably a material containing a lithium element, a sulfur element, a phosphorus element, and a halogen element from the viewpoint of obtaining a solid electrolyte containing a lithium element, a sulfur element, a phosphorus element, and a halogen element, and examples thereof include a solid electrolyte having an $Li_3PS_4$ structure.

Accordingly, in the production method of a solid electrolyte of the present invention, there are preferably included the following four embodiments depending upon whether or not a solid electrolyte having an $Li_3PS_4$ structure or the like is used as the solid electrolyte raw material, and whether or not a solvent is used. Examples of preferred modes of these four embodiments are shown in FIG. 1 (Embodiments A and B) and FIG. 2 (Embodiments C and D). That is, in the production method of a solid electrolyte of the present embodiment, there are preferably included a production method of using raw materials, such as lithium sulfide and diphosphorus pentasulfide, as a solid electrolyte raw material and a complexing agent having an ester group and also having at least one branch (Embodiment A); a production method of containing a raw material, such as an $Li_3PS_4$ structure that is an electrolyte main structure as a solid electrolyte raw material and a complexing agent having an ester group and also having at least one branch (Embodiment B); a production method of adding a solvent to the raw materials, such as lithium sulfide, as the solid electrolyte raw material and the complexing agent having an ester group and also having at least one branch in the aforementioned Embodiment A (Embodiment C); and a production method of adding a solvent to the raw materials, such as an $Li_3PS_4$ structure, as the solid electrolyte raw material and the complexing agent having an ester group and also having at least one branch in the aforementioned Embodiment B (Embodiment D).

The Embodiments A to D are hereunder described in order.

Embodiment A

As shown in FIG. 1, the Embodiment A is concerned with a mode in which in a production method of the present embodiment including mixing a solid electrolyte raw material with a complexing agent having an ester group and also having at least one branch, lithium sulfide and diphosphorus pentasulfide, and the like are used as the solid electrolyte raw material. By mixing the solid electrolyte raw material with the complexing agent having an ester group and also having at least one branch, in general, an electrolyte precursor inclusion that is a suspension is obtained, and by drying it, the electrolyte precursor is obtained. Furthermore, by heating the electrolyte precursor, the crystalline solid electrolyte is obtained. While the description is hereunder made beginning from Embodiment A, one described with the wordings "of the present embodiment" is a matter applicable even in other embodiments.

Solid Electrolyte Raw Material

The solid electrolyte raw material which is used in the present embodiment is preferably a material containing a lithium element, a sulfur element, a phosphorus element, and a halogen element from the viewpoint of obtaining the solid electrolyte containing a lithium element, a sulfur element, a phosphorus element, and a halogen element.

As the solid electrolyte raw material, for example, a compound containing at least one of a lithium element, a sulfur element, a phosphorus element, and a halogen element can be used. More specifically, representative examples of the foregoing compound include raw materials composed of at least two elements selected from the aforementioned four elements, such as lithium sulfide; lithium halides, e.g., lithium fluoride, lithium chloride, lithium bromide, and lithium iodide; phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), with bromine ($Br_2$) and iodine ($I_2$) being preferred.

As materials which may be used as the raw material other than those mentioned above, a compound containing not only at least one element selected from the aforementioned four elements but also other element than the foregoing four elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halogen, an antimony halide, a tellurium halide, and a bismuth halide; and phosphorus oxyhalides, such as phosphorus oxychloride ($POCl_3$) and phosphorus oxybromide ($POBr_3$).

In the Embodiment A, among them, phosphorus sulfides, such as lithium sulfide, diphosphorus trifluoride ($P_2S_3$), and diphosphorus pentasulfide ($P_2S_5$); halogen simple substances, such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred as the raw material from the viewpoint of more easily obtaining a solid electrolyte having a high ionic conductivity. Preferred examples of a combination of raw materials include a combination of lithium sulfide, diphosphorus pentasulfide, and a lithium halide; and a combination of lithium sulfide, phosphorus pentasulfide, and a halogen simple substance, in which the lithium halide is preferably lithium bromide or lithium iodide, and the halogen simple substance is preferably bromine or iodine.

The lithium sulfide which is used in the Embodiment A is preferably a particle.

An average particle diameter ($D_{50}$) of the lithium sulfide particle is preferably 10 μm or more and 2,000 μm or less, more preferably 30 μm or more and 1,500 μm or less, and still more preferably 50 μm or more and 1,000 μm or less. In this specification, the average particle diameter ($D_{50}$) is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In addition, among the above-exemplified raw materials, the solid raw material is preferably a material having an average particle diameter of the same degree as in the aforementioned lithium sulfide particle, namely a material having an average particle diameter falling within the same range as in the aforementioned lithium sulfide particle is preferred.

In the case of using lithium sulfide, diphosphorus pentasulfide, and the lithium halide as the raw materials, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 76 mol %.

In the case of using lithium sulfide, diphosphorus pentasulfide, a lithium halide, and other raw material to be optionally used, the content of lithium sulfide and diphosphorus pentasulfide relative to the total of the aforementioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the case of using not only a halogen simple substance but also lithium sulfide and diphosphorus pentasulfide as the raw materials, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and even yet still more preferably within a range of 73 to 77%. This is because when the foregoing proportion falls within the aforementioned ranges, a higher ionic conductivity is obtained. In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus penta-sulfide, a halogen simple substance, and a lithium halide, the content ($\alpha$ mol %) of the halogen simple substance and the content ($\beta$ mol %) of the lithium halide relative to the total of the aforementioned raw materials preferably satisfy the following expression (2), more preferably satisfy the following expression (3), still more preferably satisfy the following expression (4), and yet still more preferably satisfy the following expression (5).

$$2 \le (2\alpha + \beta) \le 100 \tag{2}$$

$$4 \le (2\alpha + \beta) \le 80 \tag{3}$$

$$6 \le (2\alpha + \beta) \le 50 \tag{4}$$

$$6 \le (2\alpha + \beta) \le 30 \tag{5}$$

In the case of using two halogen simple substances, when the molar number in the substance of the halogen element of one side is designated as A1, and the molar number in the substance of the halogen element of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is desig-nated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

Complexing Agent

In the production method of a solid electrolyte of the present embodiment, a complexing agent having an ester group and also having at least one branch is used. The complexing agent as referred to in this specification is a substance capable of forming a complex together with the lithium element and means a material having such properties of acting with the lithium element-containing sulfide and the halide, and the like contained in the aforementioned raw materials, thereby promoting formation of the electrolyte precursor. Although the reason why the complexing agent contributes to the crystal structure formation of the solid electrolyte is not elucidated yet, the following may be conjectured. Namely, in the present embodiment, in view of the fact that the complexing agent has an ester group, the formation of a complex with the lithium element and an action with the sulfide containing the lithium element, the halide and the like are readily generated, whereas in view of the fact that the complexing agent has at least one branch, during forming the crystal structure of the solid electrolyte, the complex is readily decomposed. An optimum balance between the aforementioned two phenomena is readily taken, and therefore, it may be considered that the formation of the electrolyte precursor is readily promoted.

As the complexing agent, any material can be used without being particularly restricted so long as it has the aforementioned structure. Above all, an oxygen element and an oxygen element-containing ester group have such prop-erties that they are readily coordinated (bound) with the lithium element, and therefore, the affinity with the lithium element is improved, and a complex with the lithium ele-ment is readily formed.

In the complexing agent, the oxygen element and the oxygen element-containing ester group in the molecule thereof have a high affinity with the lithium element, and it may be considered that the complexing agent has such properties of binding with the lithium-containing structure which is existent as a main structure in the solid electrolyte obtained by the production method of the present invention, such as $Li_3PS_4$ containing representatively a $PS_4$ structure, and the lithium-containing raw materials, such as a lithium halide, thereby easily forming an aggregate. For that reason, since by mixing the aforementioned solid electrolyte raw material and the complexing agent having the aforemen-tioned specified structure, an aggregate via the lithium-containing structure, such as a $PS_4$ structure, or the com-plexing agent, and an aggregate via the lithium-containing raw material, such as a lithium halide, or the complexing agent are evenly existent, whereby an electrolyte precursor in which the halogen element is more likely dispersed and fixed is obtained, and as a result, it may be considered that a solid electrolyte having a high ionic conductivity, in which the generation of hydrogen sulfide is suppressed, is obtained.

The complexing agent which is used in the present embodiment is a material having at least one branch. In view of the fact that the complexing agent has a branch structure, the reaction in which the oxygen element and the oxygen element-containing ester group and the lithium element form a complex and the decomposition of the complex due to steric hindrance occur with a good balance, and therefore, an aggregate via the lithium-containing structure, such as a $PS_4$ structure, or the complexing agent, and an aggregate via the lithium-containing raw material, such as a lithium halide, or the complexing agent are evenly existent, whereby a solid electrolyte precursor is readily obtained. As a result, it may be considered that the solid electrolyte obtained by the production method of the present embodiment becomes a solid electrolyte capable of improving the ionic conductiv-ity.

Although the complexing agent which is used in the present embodiment is not particularly restricted so long as it is a material having an ester group and also having at least one branch, from the viewpoint of obtaining a solid elec-trolyte having a high ionic conductivity, a material having a boiling point of 100° C. or higher is preferred, the boiling point being more preferably 120° C. or higher, still more preferably 130° C. or higher, yet still more preferably 140° C. or higher, and especially preferably 145° C. or higher.

The boiling point of the complexing agent in this speci-fication is a boiling point confirmed by SDS of each of reagent manufactures.

As mentioned already, in the present embodiment, the solid electrolyte having a high ionic conductivity is obtained so long as the complexing agent has at least one ester group and at least one branch. From the viewpoint of improving the ionic conductivity, a complexing agent having one ester group and at least one branch is preferred, and a complexing agent having one ester group or two or more branches is more preferred, and a complexing agent having one ester group and two branches is still more preferred.

As the complexing agent, a material having an oxygen element-containing group together with an ester group and having two or more of the groups can also be used. In this case, examples of these oxygen element-containing group to be combined with the ester group include an ester group, an ether group, an aldehyde group, an alkoxy group, a carboxy group, a carbonyl group, an amide group, and a nitro group. Above all, an ether group is preferred from the viewpoint of not only improving the ionic conductivity but also more suppressing the generation of hydrogen sulfide. Accordingly, in the present embodiment, a complexing agent having an ester group and at least one selected from an ester group and an ether group, with a total of these groups being two or more is preferred, a complexing agent having an ester group and an ether group is more preferred, and a complexing agent having one ester group and one ether group is still more preferred.

In the case of using a complexing agent having two or more of these oxygen element-containing groups in the molecule, since the lithium element-containing structure, such as $Li_3PS_4$ containing a $PS_4$ structure, and the lithium element-containing raw material, such as a lithium halide, can be bound with each other via at least two oxygen elements in the molecule, the halogen element is more likely dispersed and fixed in the electrolyte precursor. As a result, it may be considered that a solid electrolyte having a high ionic conductivity, in which generation of hydrogen sulfide is suppressed, is readily obtained.

In this case, from the viewpoint of making the complexing agent have appropriate steric hindrance, the complexing agent preferably has one branch. That is, in the case where the complexing agent has an oxygen element-containing group together with an ester group and has two or more of these groups, a material having one branch is preferred, a material having an ester group and at least one selected from an ester group and an ether group, with a total of these groups being two or more, and also having one branch is more preferred, and a material having one ester group and one ether group and also having one branch is still more preferred.

As the complexing agent, for example, a compound represented by the following general formula (1) is preferably exemplified.

$$R^{11}—X_{11}—R^{12}—X_{12}—R^{13} \qquad (1)$$

In the general formula (1), $X_{11}$ and $X_{12}$ are each independently a single bond, an ester group, or an ether group, and at least one of $X_{11}$ and $X_{12}$ is an ester group; $R^{11}$ and $R^{13}$ are each independently a hydrogen atom or a monovalent hydrocarbon group having 1 to 12 carbon atoms; $R^{12}$ is a single bond or a divalent hydrocarbon group having 1 to 12 carbon atoms; and at least one of $R^{11}$, $R^{12}$, and $R^{13}$ has a branch.

Examples of the monovalent hydrocarbon group having 1 to 12 carbon atoms represented by $R^{11}$ and $R^{13}$ include alkyl groups, such as a methyl group, an ethyl group, a propyl group, a 2-propyl group, a butyl group, an isobutyl group, a sec-butyl group, a tert-butyl group, various pentyl groups, various hexyl groups, various heptyl groups, various octyl groups, various nonyl groups, various decyl groups, various undecyl groups, and various dodecyl groups; alkenyl groups corresponding to the foregoing alkyl groups, resulting from eliminating two hydrogen atoms from the foregoing alkyl groups; cycloalkyl groups, such as a cyclopropyl group, a cyclobutyl group, a cyclopentyl group, a cyclohexyl group, various methylcyclohexyl groups, various ethylcyclohexyl groups, and various dimethylcyclohexyl groups; aryl groups, such as a phenyl group, a naphthyl group, various methylphenyl groups, various ethylphenyl groups, and various dimethylphenyl group; and arylalkyl groups, such as a benzyl group, various phenylethyl groups, and various methylbenzyl groups. Above all, alkyl groups are preferred from the viewpoint of improving the ionic conductivity of the obtained solid electrolyte. In this specification, the wording "various" means that all estimated isomers are included, and the aforementioned four kinds of butyl groups may be generally named as "various butyl groups". In addition, the cyclobutyl group is included in the concept of "various butyl groups", so that there is overlapping. However, in this specification, either one may be preferentially used, and for example, the "cyclobutyl group" may be preferentially used.

The monovalent hydrocarbon group having 1 to 12 carbon atoms represented by $R^{11}$ and $R^{13}$ may be a substituted hydrocarbon group.

The divalent hydrocarbon group having 1 to 12 carbon atoms represented by $R^{12}$ is a divalent hydrocarbon group resulting from eliminating one hydrogen atom from the aforementioned alkyl group, alkenyl group, or cycloalkyl group, and examples thereof include an alkanediyl group, an alkenediyl group, and a cycloalkanediyl group. In addition, examples of the divalent hydrocarbon group resulting from eliminating one hydrogen atom from the aforementioned aryl group or arylalkyl group include arylene groups having a divalent binding site in an aromatic moiety, such as a phenylene group, a naphthylene group, various methylphenylene groups, various ethylphenylene groups, and various dimethylphenylene groups; divalent groups resulting from eliminating one hydrogen atom from an alkyl group of an aryl group, such as the aforementioned various methylphenyl groups, various ethylphenyl groups, and various dimethylphenyl groups; and divalent groups resulting from eliminating one hydrogen atom from an alkyl group moiety or aromatic ring moiety of the aforementioned arylalkyl group.

Of these, an alkanediyl group is preferred from the viewpoint of improving the ionic conductivity of the obtained solid electrolyte.

The divalent hydrocarbon group having 1 to 12 carbon atoms represented by $R^{12}$ may be a substituted hydrocarbon group.

In the case where $R^{11}$ and $R^{13}$ are each a hydrocarbon group, the carbon number thereof is preferably 1 to 10, more preferably 1 to 8, still more preferably 1 to 5, and yet still more preferably 1 to 4 from the viewpoint of improving the ionic conductivity of the obtained solid electrolyte. In addition, in the case where $R^{12}$ is a hydrocarbon group, the carbon number thereof is preferably 1 to 10, more preferably 1 to 8, still more preferably 1 to 4, and yet still more preferably 1 to 3 from the same viewpoint.

With respect to $R^{11}$, $R^{12}$, and $R^{13}$, at least one of these is a group having a branch. In view of the fact that $R^{11}$, $R^{12}$, and $R^{13}$ are such a group, the complexing agent represented by the general formula (1) becomes a material having at least one branch.

Any one of $R^{11}$, $R^{12}$, and $R^{13}$ may be branched; two or more thereof may be branched; and $R^{11}$, $R^{12}$, and $R^{13}$ may be a group having one branch or may be a group having two or more branches. In addition, in the case where the complexing agent has two branches, one group of $R^{11}$, $R^{12}$, and $R^{13}$ may be a group having two branches (for example, a 2,3-dimethylbutyl group), or two groups of $R^{11}$, $R^{12}$, and $R^{13}$ may be a group having one branch.

$X_{11}$ and $X_{12}$ are each independently a single bond, an ester group, or an ether group, and at least one of $X_{11}$ and $X_{12}$ is an ester group. According to this, the complexing agent represented by the general formula (1) becomes a material having an ester group.

The complexing agent which is used in the present embodiment is especially preferably a material having an ester group and also having at least one branch and in addition, further having a methyl ether group from the viewpoint of improving the ionic conductivity of the obtained solid electrolyte.

Such a complexing agent is preferably a material in which in the general formula (1), $R^{11}$ is an alkyl group, $R^{12}$ is an alkanediyl group, $X_{11}$ is an ester group, $X_{12}$ is an ether group, $R^{13}$ is a methyl group, and at least one of $R^{11}$ and $R^{12}$ has a branch; more preferably a material in which in the general formula (1), $R^{11}$ is an alkyl group having 1 to 4 carbon atoms, $R^{12}$ is an alkanediyl group having 1 to 4 carbon atoms, $X_{11}$ is an ester group, $X_{12}$ is an ether group, $R^{13}$ is a methyl group, and at least one of $R^{11}$ and $R^{12}$ has a branch; still more preferably a material in which in the general formula (1), $R^{11}$ is a methyl group, $R^{12}$ is an alkanediyl group having 1 to 4 carbon atoms and having a branch, $X_{11}$ is an ester group, $X_{12}$ is an ether group, and $R^{13}$ is a methyl group; and especially preferably a material in which in the general formula (1), $R^{11}$ is a methyl group, $R^{12}$ is a propane-1,2-diyl group, $X_{11}$ is an ester group, $X_{12}$ is an ether group, and $R^{13}$ is a methyl group, namely propylene glycol methyl ether acetate.

The complexing agent which is used in the present embodiment is especially preferably a material having an ester group and also having at least one branch and in addition, further having a 2-methylpropyl group in at least one end thereof from the viewpoint of improving the ionic conductivity of the obtained solid electrolyte.

Such a complexing agent is preferably a material in which in the general formula (1), $R^{11}$ is an alkyl group, $R^{12}$ is a single bond or an alkanediyl group, $X_{11}$ is an ester group, $X_{12}$ is a single bond, and $R^{13}$ is a 2-methylpropyl group; more preferably a material in which in the general formula (1), $R^{11}$ is an alkyl group having 1 to 4 carbon atoms, $R^{12}$ is a single bond or an alkanediyl group having 1 to 4 carbon atoms, $X_{11}$ is an ester group, $X_{12}$ is a single bond, $R^{13}$ is a 2-methylpropyl group, and at least one of $R^{11}$ and $R^{12}$ has a branch; still more preferably a material in which in the general formula (1), $R^{11}$ is an alkyl group having 1 to 4 carbon atoms and having a branch, $R^{12}$ is a single bond, $X_{11}$ is an ester group, $X_{12}$ is a single bond, and $R^{13}$ is a 2-methylpropyl group; and especially preferably a material in which in the general formula (1), $R^{11}$ is a 2-propyl group, $R^{12}$ is a single bond, $X_{11}$ is an ester group, $X_{12}$ is a single bond group, and $R^{13}$ is a 2-methylpropyl group, namely isobutyl isobutyrate.

As other complexing agent than the aforementioned complexing agent, for example, a compound having a group containing a hetero element, such as an oxygen element, a nitrogen element, and a halogen element, e.g., a chlorine element, is high in an affinity with the lithium element, and such a compound is exemplified as the other complexing agent than the aforementioned complexing agent.

Examples of the aforementioned other complexing agent include alcohol-based solvents, such as ethanol and butanol; ester-based solvents, such as ethyl acetate and butyl acetate; aldehyde-based solvents, such as formaldehyde, acetaldehyde, and dimethylformamide; ketone-based solvents, such as acetone and methyl ethyl ketone; ether-based solvents, such as diethyl ether, diisopropyl ether, dibutyl ether, tetrahydrofuran, dimethoxyethane, cyclopentyl methyl ether, tert-butyl methyl ether, and anisole; halogen element-containing aromatic hydrocarbon solvents, such as trifluoromethylbenzene, nitrobenzene, chlorobenzene, chlorotoluene, and bromobenzene; amine-based solvents, such as tetramethylethylenediamine, tetraethylethylenediamine, tetramethyldiaminopropane, tetraethyldiaminopropane, cyclopropanediamine, tolylenediamine, and tetraethylenepentamine; and solvents containing a carbon atom and a hetero atom, such as acetonitrile, dimethyl sulfoxide, and carbon disulfide. Of these, ether-based solvents are preferred; diethyl ether, diisopropyl ether, dibutyl ether, and tetrahydrofuran are more preferred; and diethyl ether, diisopropyl ether, and dibutyl ether are still more preferred.

Mixing

As shown in the flow chart of FIG. 1, the solid electrolyte raw material and the complexing agent having an ester group and also having at least one branch are mixed. In the present embodiment, though a mode of mixing the solid electrolyte raw material and the complexing agent may be in any of a solid state and a liquid state, in general, the solid electrolyte raw material contains a solid, whereas the complexing agent is in a liquid state, and therefore, in general, mixing is made in a mode in which the solid electrolyte raw material in a solid state is existent in the liquid complexing agent.

The content of the solid electrolyte raw material is preferably 5 g or more, more preferably 10 g or more, still more preferably 30 g or more, and yet still more preferably 50 g or more relative to the amount of one liter of the complexing agent, and an upper limit thereof is preferably 500 g or less, more preferably 400 g or less, still more preferably 300 g or less, and yet still more preferably 250 g of less. When the content of the solid electrolyte raw material falls within the aforementioned range, the solid electrolyte raw material is readily mixed, the dispersing state of the raw materials is enhanced, and the reaction among the raw materials is promoted, and therefore, the electrolyte precursor and further the solid electrolyte are readily efficiently obtained.

A method for mixing the solid electrolyte raw material and the complexing agent is not particularly restricted, and the raw materials contained in the solid electrolyte raw material and the complexing agent may be charged in an apparatus capable of mixing the solid electrolyte raw material and the complexing agent and mixed. For example, by feeding the complexing agent into a tank, actuating an impeller, and then gradually adding the raw materials, a favorable mixing state of the solid electrolyte raw material is obtained, and dispersibility of the raw materials is enhanced, and thus, such is preferred.

In the case of using a halogen simple substance as the raw material, there is a case where the raw material is not a solid. Specifically, fluorine and chlorine are a gas, and bromine is a liquid under normal temperature and normal pressure. For example, in the case where the raw material is a liquid, it may be fed into the tank separately from the other solid raw materials together with the complexing agent, and in the case where the raw material is a gas, the raw material may be fed such that it is blown into the complexing agent having the solid raw materials added thereto.

The production method of a solid electrolyte of the present embodiment is characterized by including mixing the solid electrolyte raw material and the complexing agent, and the solid electrolyte can also be produced by a method not using an instrument to be used for the purpose of pulverization of the solid raw materials, which is generally called a pulverizer, such as a medium type pulverizer, e.g., a ball mill and a bead mill. According to the production method of a solid electrolyte of the present embodiment, by merely mixing the solid electrolyte raw material and the complexing agent, the raw materials and the complexing agent contained in the inclusion are mixed, whereby the electrolyte precursor can be formed. In view of the fact that a mixing time for obtaining the electrolyte precursor can be shortened, or atomization can be performed, the mixture of the solid electrolyte raw material and the complexing agent may be pulverized by a pulverizer.

Examples of an apparatus for mixing the solid electrolyte raw material and the complexing agent include a mechanical agitation type mixer having an impeller provided in a tank. Examples of the mechanical agitation type mixer include a high-speed agitation type mixer and a double arm type mixer, and a high-speed agitation type mixer is preferably used from the viewpoint of increasing the homogeneity of raw materials in the mixture of the solid electrolyte raw material and the complexing agent and obtaining a higher ionic conductivity. In addition, examples of the high-speed agitation type mixer include a vertical axis rotating type mixer and a lateral axis rotating type mixer, and mixers of any of these types may be used.

Examples of a shape of the impeller which is used in the mechanical agitation type mixer include a blade type, an arm type, a ribbon type, a multistage blade type, a double arm type, a shovel type, a twin-shaft blade type, a flat blade type, and a C type blade type. From the viewpoint of increasing the homogeneity of raw materials in the solid electrolyte raw material and obtaining a higher ionic conductivity, a shovel type, a flat blade type, a C type blade type, and the like are preferred.

A temperature condition on the occasion of mixing the solid electrolyte raw material and the complexing agent is not particularly limited, and for example, it is −30 to 100° C., preferably −10 to 50° C., and more preferably around room temperature (23° C.) (for example, (room temperature) ±about 5° C.). In addition, a mixing time is about 0.1 to 150 hours, and from the viewpoint of more uniformly mixing the solid electrolyte raw material and the complexing agent and obtaining a higher ionic conductivity, the mixing time is preferably 1 to 120 hours, more preferably 4 to 100 hours, and still more preferably 8 to 80 hours.

By mixing the solid electrolyte raw material and the complexing agent, owing to an action of the lithium element, the sulfur element, the phosphorus element, and the halogen element, all of which are contained in the raw materials, with the complexing agent, an electrolyte precursor in which these elements are bound directly with each other via and/or not via the complexing agent is obtained. That is, in the production method of a solid electrolyte of the present embodiment, the electrolyte precursor obtained through mixing of the solid electrolyte raw material and the complexing agent is constituted of the complexing agent, the lithium element, the sulfur element, the phosphorus element, and the halogen element, and by mixing the solid electrolyte raw material and the complexing agent, a material containing the electrolyte precursor (hereinafter sometimes referred to as "electrolyte precursor inclusion") is obtained. In the present embodiment, the resulting electrolyte precursor is not one completely dissolved in the complexing agent that is a liquid, and typically, a suspension containing the electrolyte precursor that is a solid is obtained. In consequence, the production method of a solid electrolyte of the present embodiment is corresponding to a heterogeneous system in a so-called liquid-phase method.

Drying

The production method of a solid electrolyte of the present embodiment may include drying of the electrolyte precursor inclusion (typically, suspension). According to this, a powder of the electrolyte precursor is obtained. By performing drying in advance, it becomes possible to efficiently perform heating. The drying and the subsequent heating may be performed in the same process.

The electrolyte precursor inclusion can be dried at a temperature according to the kind of the remaining complexing agent (complexing agent not incorporated into the electrolyte precursor). For example, the drying can be performed at a temperature of a boiling point of the complexing agent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature)±about 5° C.), to volatilize the complexing agent.

The drying may be performed by subjecting the electrolyte precursor inclusion to solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the electrolyte precursor inclusion is transferred into a container, and after the electrolyte precursor is precipitated, the complexing agent and solvent as a supernatant are removed, or filtration with a glass filter having a pore size of, for example, about 10 to 200 μm, and preferably 20 to 150 μm, is easy.

The electrolyte precursor is constituted of the complexing agent, the lithium element, the sulfur element, the phosphorus element, and the halogen element. In addition, in the X-ray diffraction pattern in the X-ray diffractometry, there is a case where peaks different from the peaks derived from the raw materials are observed depending upon the drying temperature. In the present embodiment, the electrolyte precursor is preferably a material containing a co-crystal constituted of the complexing agent, the lithium element, the sulfur element, the phosphorus element, and the halogen element.

The electrolyte precursor (co-crystal) has such a characteristic feature that it has a structure different from the crystalline solid electrolyte.

The co-crystal is constituted of the complexing agent, the lithium element, the sulfur element, the phosphorus element, and the halogen element, and typically, it may be presumed that a complex structure in which the lithium element and the other elements are bound directly with each other via and/or not via the complexing agent is formed.

Here, the fact that the complexing agent constitutes the co-crystal can be, for example, confirmed through gas chromatography analysis. Specifically, the complexing agent contained in the co-crystal can be quantitated by dissolving a powder of the electrolyte precursor in methanol and subjecting the obtained methanol solution to gas chromatography analysis.

In the production method of a solid electrolyte of the present embodiment, what the co-crystal containing the halogen element is formed is preferred from the standpoint of enhancing the ionic conductivity. By using the complexing agent, the lithium-containing structure, such as a $PS_4$ structure, and the lithium-containing raw materials, such as a lithium halide, are bound (coordinated) with each other via the complexing agent, the co-crystal in which the halogen element is more likely dispersed and fixed is readily obtained, and the ionic conductivity is enhanced.

The matter that the halogen element in the electrolyte precursor constitutes the co-crystal can be confirmed from the fact that even when the solid-liquid separation of the electrolyte precursor inclusion is performed, the predetermined amount of the halogen element is contained in the electrolyte precursor. This is because the halogen element which does not constitute the co-crystal is easily eluted as compared with the halogen element constituting the co-crystal and discharged into the liquid of solid-liquid separation. In addition, the foregoing matter can also be confirmed from the fact that by performing composition analysis through ICP analysis (inductively coupled plasma atomic emission spectrophotometry) of the electrolyte precursor or solid electrolyte, a proportion of the halogen element in the electrolyte precursor or solid electrolyte is not remarkably lowered as compared with a proportion of the halogen element fed from the raw materials.

The amount of the halogen element remaining in the electrolyte precursor is preferably 30% by mass or more, more preferably 35% by mass or more, and still more preferably 40% by mass or more relative to the charged composition. An upper limit of the halogen element remaining in the electrolyte precursor is 100% by mass.

Heating

It is preferred that the production method of a solid electrolyte of the present embodiment includes heating of the electrolyte precursor to obtain the amorphous solid electrolyte; and heating of the electrolyte precursor or amorphous solid electrolyte to obtain the crystalline solid electrolyte. In view of the fact that heating of the electrolyte precursor is included, the complexing agent in the electrolyte precursor is removed, and the amorphous solid electrolyte and the crystalline solid electrolyte each containing the lithium element, the sulfur element, the phosphorus element, and the halogen element are obtained. Here, the fact that the complexing agent in the electrolyte precursor is removed is supported by the facts that in addition to the fact that it is evident from the results of the X-ray diffraction pattern, the gas chromatography analysis, and the like that the complexing agent constitutes the co-crystal of the electrolyte precursor, the solid electrolyte obtained by removing the complexing agent through heating of the electrolyte precursor is identical in the X-ray diffraction pattern with the solid electrolyte obtained by the conventional method without using the complexing agent.

In the production method of the present embodiment, the solid electrolyte is obtained by heating the electrolyte precursor to remove the complexing agent in the electrolyte precursor, and it is preferred that the content of the complexing agent in the solid electrolyte is low as far as possible. However, the complexing agent may be contained to an extent that the performance of the solid electrolyte is not impaired. The content of the complexing agent in the solid electrolyte may be typically 10% by mass or less, and it is preferably 5% by mass or less, more preferably 3% by mass or less, and still more preferably 1% by mass or less.

In the production method of the present embodiment, in order to obtain the crystalline solid electrolyte, it may be obtained by heating the electrolyte precursor, or it may be obtained by heating the electrolyte precursor to obtain the amorphous solid electrolyte and then heating the amorphous solid electrolyte. That is, in the production method of the present embodiment, the amorphous solid electrolyte can also be produced.

In the production method of a solid electrolyte of the present embodiment, whether or not the amorphous solid electrolyte is obtained, whether or not the crystalline solid electrolyte is obtained, whether or not after obtaining the amorphous solid electrolyte, the crystalline solid electrolyte is obtained, or whether or not the crystalline solid electrolyte is obtained directly from the electrolyte precursor is appropriately selected according to the desire, and is able to be adjusted by the heating temperature, the heating time, or the like.

For example, in the case of obtaining the amorphous solid electrolyte, the heating temperature of the electrolyte precursor may be determined according to the structure of the crystalline solid electrolyte which is obtained by heating the amorphous solid electrolyte (or the electrolyte precursor). Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher. By regulating the heating temperature to such a temperature range, the amorphous solid electrolyte is obtained more efficiently and surely. Although the heating temperature for obtaining the amorphous solid electrolyte cannot be unequivocally prescribed because it varies with the structure of the resulting crystalline solid electrolyte, in general, it is preferably 135° C. or lower, more preferably 130° C. or lower, and still more preferably 125° C. or lower. Although a lower limit of the heating temperature is not particularly limited, it is preferably 50° C. or higher, more preferably 70° C. or higher, still more preferably 80° C. or higher, yet still more preferably 100° C. or higher, and especially preferably 110° C. or higher.

In the case of obtaining the crystalline solid electrolyte by heating the amorphous solid electrolyte or directly from the electrolyte precursor, the heating temperature may be determined according to the structure of the crystalline solid electrolyte, and it is preferably higher than the aforementioned heating temperature for obtaining the amorphous solid electrolyte. Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline solid electrolyte is obtained more efficiently and surely. Although the heating temperature for obtaining the crystalline solid electrolyte cannot be unequivocally prescribed because it varies with the structure of the resulting crystalline solid electrolyte, in general, it is preferably 130° C. or higher, more preferably 135° C. or higher, and still more preferably 140° C. or higher. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous solid electrolyte or crystalline solid electrolyte is obtained, for example, it is preferably 1 minute or more, more preferably 10 minutes or more, still more preferably 30 minutes or more, and yet still more preferably 1 hour or more. In addition, though an upper limit of the heating time is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuo). This is because deterioration (for example, oxidation) of the crystalline solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism, or the like may be selected according to the heating treatment amount.

Amorphous Solid Electrolyte

The amorphous solid electrolyte which is obtained by the production method of a solid electrolyte of the present embodiment contains the lithium element, the sulfur element, the phosphorus element, and the halogen element. As representative examples thereof, there are preferably exemplified solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and solid electrolytes further containing other element, such as an oxygen element and a silicon element, for example, $Li_2S$—$P_2S_5$—$Li_2O$—LiI and $Li_2S$—$SiS_2$—$P_2S_5$—LiI. From the viewpoint of obtaining a higher ionic conductivity, solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferred.

The kinds of the elements constituting the amorphous solid electrolyte can be confirmed by, for example, an inductivity coupled plasma optical emission spectrometer (ICP).

In the case where the amorphous solid electrolyte obtained in the production method of a solid electrolyte of the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous solid electrolyte obtained in the production method of a solid electrolyte of the present embodiment is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous solid electrolyte obtained in the production method of a solid electrolyte of the present embodiment, a blending ratio (molar ratio) of lithium element to sulfur element to phosphorous element to halogen element is preferably (1.0 to 1.8)/(1.0 to 2.0)/(0.1 to 0.8)1(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the aforementioned range, it becomes easy to provide a solid electrolyte having a thio-LISICON Region II-type crystal structure which will be described later and having a higher ionic conductivity.

Although the shape of the amorphous solid electrolyte is not particularly restricted, examples thereof include a granular shape. The average particle diameter ($D_{50}$) of the granular amorphous solid electrolyte is, for example, within a range of 0.01 to 500 μm, and 0.1 to 200 μm.

Crystalline Solid Electrolyte

The crystalline solid electrolyte obtained by the production method of a solid electrolyte of the present embodiment may be a so-called glass ceramics which is obtained by heating the amorphous solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around of $2\theta=20.2°$ and $23.6°$ (see, for example, JP 2013-16423 A).

In addition, examples thereof include crystal structures which may have a $PS_4^{3-}$ skeleton, such as an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725).

Among those mentioned above, the crystalline solid electrolyte obtained by the production method of a solid electrolyte of the present embodiment is preferably a solid electrolyte containing a $PS_4^{3-}$ skeleton, and more preferably a solid electrolyte containing a thio-LISICON Region II-type crystal structure from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure. In addition, though the crystalline solid electrolyte obtained by the production method of a solid electrolyte of the present embodiment may be one having the aforementioned thio-LISICON Region II-type crystal structure or may be one having the thio-LISICON Region II-type crystal structure as a main crystal, it is preferably one having the thio-LISICON Region II-type crystal structure as a main crystal from the viewpoint of obtaining a higher ionic conductivity. In this specification, the wording "having as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline solid electrolyte obtained by the production method of a solid electrolyte of the present embodiment is preferably one not containing crystalline $Li_3PS_4$ ($\beta$-$Li_3PS_4$).

In the X-ray diffractometry using a CuK$\alpha$ ray, the $Li_3PS_4$ crystal structure gives diffraction peaks, for example, at around $2\theta=17.5°$, $18.3°$, $26.1°$, $27.3°$, and $30.0°$; the $Li_4P_2S_6$ crystal structure gives diffraction peaks, for example, at around $2\theta=16.9°$, $27.1°$, and $32.5°$; the $Li_7PS_6$ crystal structure gives diffraction peaks, for example, at around $2\theta=15.3°$, $25.2°$, $29.6°$, and $31.0°$; the $Li_7P_3S_{11}$ crystal structure gives diffraction peaks, for example, at around $2\theta=17.8°$, $18.5°$, $19.7°$, $21,8°$, $23.7°$, $25.9°$, $29.6°$, and $30.0°$; the $Li_{4-x}Ge_{1-x}P_xS_4$-based thio-LISICON Region II-type crystal structure gives diffraction peaks, for example, at around $2\theta=20.1°$, $23.9°$, and $29.5°$; and the crystal structure similar to the $Li_{4-x}Ge_{1-x}P_xS_4$-based thio-LISICON Region II-type crystal structure gives diffraction peaks, for example, at around $2\theta=20.2$ and $23.6°$. The position of these peaks may vary within a range of $\pm0.5°$.

As mentioned above, in the case when the thio-LISICON Region II-type crystal structure is obtained in the present embodiment, the foregoing crystal structure is preferably one not containing crystalline $Li_3PS_4$ ($\beta$-$Li_3PS_4$). In addition, in this case, it is preferred that the solid electrolyte containing the thio-LISICON Region II-type crystal structure does not have diffraction peaks at $2\theta=17.5°$ and $26.1°$.

Although the shape of the crystalline solid electrolyte is not particularly restricted, examples thereof include a granular shape. The average particle diameter ($D_{50}$) of the granular crystalline solid electrolyte is, for example, within a range of 0.01 to 500 μm, and 0.1 to 200 μm.

Embodiment B

Next, the Embodiment B is described.

The Embodiment B is concerned with a mode in which in the production method of the present embodiment including mixing a solid electrolyte raw material containing a lithium element, a sulfur element, a phosphorus element, and a halogen element with a complexing agent having an ester group and also having at least one branch, raw materials containing a solid electrolyte having an $Li_3PS_4$ structure or the like as the raw material and the complexing agent having an ester group and also having at least one branch are used. In the Embodiment A, the electrolyte precursor is formed while synthesizing the lithium-containing structure, such as $Li_3PS_4$, existent as a main structure in the solid electrolyte obtained by the production method of the present embodiment, through reaction among the raw materials, such as lithium sulfide, and therefore, it may be considered that a constitution ratio of the aforementioned structure is liable to become small.

Then, in the Embodiment B, a solid electrolyte containing the aforementioned structure is previously prepared by means of production or the like, and this is used as the raw material. According to this, an electrolyte precursor in which the aforementioned structure and the raw materials containing lithium, such as the lithium halide, are bound (coordinated) with each other via the complexing agent having an ester group and also having at least one branch, and the halogen element is dispersed and fixed is more likely obtained. As a result, a solid electrolyte having a high ionic conductivity, in which the generation of hydrogen sulfide is suppressed, is obtained.

Examples of the raw material containing a lithium element, a sulfur element, and a phosphorus element, which may be used in the Embodiment B, include an amorphous solid electrolyte (also namely as "amorphous $Li_3PS_4$") or a crystalline solid electrolyte (also namely as "crystalline $Li_3PS_4$"), each having an $Li_3PS_4$ structure as a molecular structure. From the viewpoint of suppressing the generation of hydrogen sulfide, an $Li_4P_2S_7$ structure-free amorphous solid electrolyte or crystalline solid electrolyte is preferred. As such a solid electrolyte, ones produced by a conventionally existing production method, such as a mechanical milling method, a slurry method, and a melt quenching method, can be used, and commercially available products can also be used.

In this case, the solid electrolyte containing a lithium element, a sulfur element, and a phosphorus element is preferably an amorphous solid electrolyte. The dispersibility of the halogen element in the electrolyte precursor is enhanced, and the halogen element is easily bound with the lithium element, the sulfur element, and the phosphorus element in the solid electrolyte, and as a result, a solid electrolyte having a higher ionic conductivity can be obtained.

In the embodiment B, the content of the amorphous solid electrolyte having an $Li_3PS_4$ structure or the like is preferably 60 to 100 mol %, more preferably 65 to 90 mol %, and still more preferably 70 to 80 mol % relative to the total of the raw materials.

In the case of using the amorphous solid electrolyte having an $Li_3PS_4$ structure or the like and the halogen simple substance, the content of the halogen simple substance is preferably 1 to 50 mol %, more preferably 2 to 40 mol %, still more preferably 3 to 25 mol %, and yet still more preferably 3 to 15 mol % relative to the amorphous solid electrolyte having an $Li_3PS_4$ structure or the like.

Besides, in the case of using the halogen simple substance and the lithium halide and the case of using the two halogen simple substances, the same as in the Embodiment A is applicable.

In the Embodiment B, in all other cases than the raw materials, for example, the complexing agent, the mixing, the heating, the drying, the amorphous solid electrolyte, and the crystalline solid electrolyte, and the like are the same as those described in the Embodiment A.

Embodiments C and D

As shown in the flow chart of FIG. 2, the Embodiments C and D are different from the Embodiments A and B, respectively from the standpoint that a solvent is added to the solid electrolyte raw material and the complexing agent having an ester group and also having at least one branch. The Embodiments C and D are concerned with a heterogeneous method of solid-liquid coexistence, whereas in the Embodiments A and B, the electrolyte precursor that is a solid is formed in the complexing agent that is a liquid. At this time, when the electrolyte precursor is easily soluble in the complexing agent, there is a case where separation of the components is generated. In the Embodiments C and D, by using a solvent in which the electrolyte precursor is insoluble, elution of the components in the electrolyte precursor can be suppressed.

Solvent

In the production method of a solid electrolyte of the Embodiments C and D, it is preferred to add the solvent to the solid electrolyte raw material and the complexing agent having an ester group and also having at least one branch. In view of the fact that the solid electrolyte raw material and the complexing agent are mixed using the solvent, an effect to be brought by using the complexing agent, namely an effect in which formation of the electrolyte precursor acting with the lithium element, the sulfur element, the phosphorus element, and the halogen element is promoted, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen element is more likely dispersed and fixed is obtained, as a result, an effect for obtaining a high ionic conductivity is easily exhibited.

The production method of a solid electrolyte of the present embodiment is a so-called heterogeneous method, and it is preferred that the electrolyte precursor is not completely dissolved in the complexing agent that is a liquid but deposited. In the Embodiments C and D, by adding the solvent, the solubility of the electrolyte precursor can be adjusted. In particular, the halogen element is liable to be eluted from the electrolyte precursor, and therefore, by adding the solvent, the elution of the halogen element is suppressed, whereby the desired electrolyte precursor is obtained. As a result, a crystalline solid electrolyte having a high ionic conductivity, in which the generation of hydrogen sulfide is suppressed, can be obtained via the electrolyte precursor in which the components, such as a halogen, are dispersed.

More specifically, as the solvent which is used in the production method of a solid electrolyte of the Embodiments C and D, it is possible to broadly adopt a solvent which has hitherto been used in the production of a solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol-based solvent, an ester-based solvent, an aldehyde-based solvent, a ketone-based solvent, an ether-based solvent, and a solvent containing a carbon atom and a hetero atom. The solvent may be appropriately selected from these solvents and used.

More specifically, examples of the solvent include aliphatic hydrocarbon solvents, such as hexane, pentane, 2-ethylhexane, heptane, octane, decane, undecane, dodecane, and tridecane; alicyclic hydrocarbon solvents, such as cyclohexane and methylcyclohexane; aromatic hydrocarbon solvents, such as benzene, toluene, xylene, mesitylene, ethylbenzene, tert-butylbenzene, trifluoromethylbenzene, nitrobenzene, chlorobenzene (9.5), chlorotoluene, and bromobenzene; alcohol-based solvents, such as ethanol and butanol; ester-based solvents, such as ethyl acetate and butyl acetate; aldehyde-based solvents, such as formaldehyde, acetaldehyde, and dimethylformamide; ketone-based solvents, such as acetone and methyl ethyl ketone; ether-based solvents, such as diethyl ether, diisopropyl ether, dibutyl ether, tetrahydrofuran, dimethoxyethane, cyclopentylmethyl ether, tert-butylmethyl ether, and anisole; and solvents containing a carbon atom and a hetero atom, such as acetonitrile, dimethyl sulfoxide, and carbon disulfide.

Of these solvents, an aliphatic hydrocarbon solvent, an alicyclic hydrocarbon solvent, an aromatic hydrocarbon solvent, and an ether-based solvent are preferred; from the viewpoint of obtaining a higher ionic conductivity more stably, heptane, cyclohexane, toluene, ethylbenzene, diethyl ether, diisopropyl ether, dibutyl ether, dimethoxyethane, cyclopentylmethyl ether, tert-butylmethyl ether, and anisole are more preferred; diethyl ether, diisopropyl ether, and dibutyl ether are still more preferred; diisopropyl ether and dibutyl ether are yet still more preferred; and dibutyl ether is especially preferred. The solvent which is used in the present embodiment is preferably the organic solvent as exemplified above and is an organic solvent different from the aforementioned complexing agent. In the present embodiment, these solvents may be used alone or in combination of plural kinds thereof.

By using such a solvent, the solvent has such properties that as compared by the aforementioned complexing agent, it relatively hardly dissolves the halogen element, the raw materials containing a halogen element, such as a lithium halide, and further the halogen element-containing component constituting the co-crystal contained in the electrolyte precursor (for example, an aggregate in which lithium halide and the complexing agent are bound with each other); it is easy to fix the halogen element within the electrolyte precursor; the halogen element is existent in a favorable state in the resulting electrolyte precursor and further the solid electrolyte; and a solid electrolyte having a high ionic conductivity is readily obtained. That is, it is preferred that the solvent which is used in the present embodiment has such properties that it does not dissolve the electrolyte precursor. In the case of using the solvent, the content of the raw materials in the solid electrolyte raw material may be regulated to one relative to one liter of the total amount of the complexing agent and the solvent.

As for drying in the Embodiments C and D, the electrolyte precursor inclusion can be dried at a temperature according to the kind of each of the remaining complexing agent (complexing agent not incorporated into the electrolyte precursor) and the solvent. For example, the drying can be performed at a temperature of a boiling point of the complexing agent or solvent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature) ±about 5° C.), to volatilize the complexing agent and the solvent. In addition, in the heating in the Embodiments C and D, in the case where the solvent remains in the electrolyte precursor, the solvent is also removed. However, different from the complexing agent constituting the electrolyte precursor, the solvent hardly constitutes the electrolyte precursor. In consequence, the content of the solvent which may remain in the electrolyte precursor is typically 3% by mass or less, preferably 2% by mass or less, and more preferably 1% by mass or less.

In the Embodiment C, in all other cases than the solvent, for example, the complexing agent, the mixing, the heating, the drying, the amorphous solid electrolyte, and the crystalline solid elements are the same as those described in the Embodiment A. In addition, in the Embodiment D, all other cases than the solvent are the same as those described in the Embodiment B.

The solid electrolyte which is obtained by the production method of a solid electrolyte of the present embodiment has a high ionic conductivity and also has an excellent battery performance, and hardly generates hydrogen sulfide, so that it is suitably used for batteries. In the case of adopting a lithium element as the conduction species, such is especially suitable. The solid electrolyte of the present embodiment may be used for a positive electrode layer, may be used for a negative electrode layer, or may be used for an electrolyte layer. Each of the layers can be produced by a known method.

The aforementioned battery preferably uses a collector in addition to the positive electrode layer, the electrolyte layer, and the negative electrode layer, and the collector can be any known one. For example, a layer formed by coating Au, Pt, Al, Ti, Cu, or the like capable of reacting with the aforementioned solid electrolyte, with Au or the like can be used.

Electrolyte Precursor

The electrolyte precursor of the present embodiment is constituted of a lithium element, a sulfur element, a phosphorus element, a halogen element, and a complexing agent having an ester group and also having at least one branch.

The electrolyte precursor of the present embodiment is the same as the electrolyte precursor described above in the production method of a solid electrolyte. In addition, the fact that the content of the complexing agent in the electrolyte precursor is preferably 10% by mass or more and 70% by mass or less is also the same as that in the electrolyte precursor described above in the production method of a solid electrolyte.

EXAMPLES

Next, the present invention is described specifically with reference to Examples, but it should be construed that the present invention is by no means restricted by these Examples.

Production Example 1

In a one-liter impeller-provided reaction tank, 15.3 g of lithium sulfide and 24.7 g of diphosphorus pentasulfide were added in a nitrogen atmosphere. After actuating the impeller, 400 mL of tetrahydrofuran which had been previously cooled to −20° C. was introduced into the container. After naturally raising the temperature to room temperature (23° C.), agitation was continued for 72 hours, the obtained reaction liquid slurry was charged in a glass filter (pore size: 40 to 100 μm) to obtain a solid component, and then, the solid component was dried at 90° C., thereby obtaining 38 g of $Li_3PS_4$ (purity: 90% by mass) as a white powder. The obtained powder was subjected to powder X-ray diffractometry (XRD) with an X-ray diffraction (XRD) apparatus (SmartLab apparatus, manufactured Rigaku Corporation). As a result, the foregoing powder expressed a hallow pattern and confirmed to be amorphous $Li_3PS_4$.

Example 1

Into a stirring bar-containing Schlenk flask (capacity: 50 mL), 1.70 g of the white powder ($Li_3PS_4$: 1.53 g) obtained in Production Example 1, 0.19 g of lithium bromide, and 0.28 g of lithium iodide were introduced in a nitrogen atmosphere. After rotating the stirring bar, 20 mL of propylene glycol monomethyl ether (PGMEA) as a complexing agent was added, agitation was continued for 72 hours, and the obtained electrolyte precursor inclusion was dried in vacuo (at room temperature: 23° C.) and then additionally subjected to vacuum drying at 80° C. for 2 hours, to obtain an electrolyte precursor as a powder. Subsequently, the powder of the electrolyte precursor was heated at 150° C. in vacuo for 2 hours, thereby obtaining a crystalline solid electrolyte (the heating temperature for obtaining a crystalline solid electrolyte (150° C. in this Example) will be sometimes referred to as "crystallization temperature").

The obtained electrolyte precursor and crystalline solid electrolyte were subjected to powder X-ray diffractometry (XRD) with an X-ray diffraction (XRD) apparatus ("D2 Phaser (trade name)", manufactured by Bruker Corporation). X-ray diffraction spectra are shown in FIGS. 3 and 4, respectively.

In the X-ray diffraction spectrum (FIG. 3) of the electrolyte precursor, a large number of peaks different from peaks of the used raw materials and the obtained crystalline solid electrolyte were observed, and they are assumed to be peaks due to the complex with the solvent. In the X-ray diffraction spectrum (FIG. 4) of the crystalline solid electrolyte, crystallization peaks were detected mainly at $2\theta=20.1°$, 23.6, and 29.3°, and the crystalline solid electrolyte had a thio-LISICON Region II-type crystal structure. An ionic conductivity of the crystalline solid electrolyte was measured and found to be $1.43\times10^{-3}$ (S/cm).

Example 2

An electrolyte precursor was fabricated in the same manner as in Example 1, except that in Example 1, 0.586 g of lithium sulfide, 0.945 g of diphosphorus pentasulfide, 0.185 g of lithium bromide, and 0.285 g of lithium iodide were used as the raw materials. Subsequently, the electrolyte precursor was subjected to heat treatment at 140° C. in vacuo to obtain a crystalline solid electrolyte. In the X-ray diffraction spectrum (FIG. 6) of the crystalline solid electrolyte, crystallization peaks were detected mainly at $2\theta=20.2°$, 23.8, and 29.5°, and the crystalline solid electrolyte had a thio-LISICON Region II-type crystal structure. An ionic conductivity of the crystalline solid electrolyte was measured and found to be $1.43\times10^{-3}$ (S/cm). In addition, the electrolyte precursor was subjected to powder X-ray diffractometry (XRD) (FIG. 5). As a result, a peak which was assumed to be assigned to the lithium sulfide ($Li_2S$) as a part of the raw materials was observed. Although the complex with the solvent was not definitely observed as compared to Example 1, an indefinite peak which was assumed to be assigned to the complex was partly observed.

Example 3

An electrolyte precursor was fabricated in the same manner as in Example 1, except that in Example 1, isobutyl isobutyrate was used as the complexing agent. The electrolyte precursor was subjected to heat treatment at 160° C. in vacuo to obtain a crystalline solid electrolyte. In the X-ray diffraction spectrum (FIG. 8) of the crystalline solid electrolyte, crystallization peaks were detected mainly at $2\theta=20.2°$, 23.8, and 29.6°, and the crystalline solid electrolyte had a thio-LISICON Region II-type crystal structure. An ionic conductivity of the crystalline solid electrolyte was measured and found to be $1.03\times10^{-3}$ (S/cm).

An electrolyte precursor (powder obtained by vacuum drying at 80° C.) was subjected to powder X-ray diffractometry (XRD) (FIG. 7). As a result, a peak which was assumed to be assigned to the complex with the solvent was not observed, but a hallow pattern was observed. It may be considered that an interaction between the solvent and the electrolyte was weakened due to addition of the branch, and the complex was already decomposed at 80° C.

Comparative Example 1

An electrolyte precursor was fabricated in the same manner as in Example 1, except that in Example 1, ethylene glycol monomethyl ether acetate was used as the complexing agent, and it was tried to subject the electrolyte precursor to vacuum drying at 80° C. for 2 hours. However, it became a sticky liquid, so that the solvent could not be removed. This was subjected to temperature rise to 150° C., but it became a sticky liquid having a high viscosity. Thus, when the resultant was returned to room temperature, it became fixed in a candy-like state to the flask. After scraping off the fixed substance in a candy-like state and pulverizing, powder X-ray diffractometry (XRD) was performed (FIG. 9). In addition, as a result of performing thermogravimetry, a weight loss of about 30% by mass was confirmed, so that the solvent greatly remained. In addition, since the solvent not having a branch was used, it may be considered that the interaction with the electrolyte precursor could not be strongly removed.

Comparative Example 2

An electrolyte precursor was fabricated in the same manner as in Example 1, except that in Example 1, dimethoxyethane was used as the complexing agent. The foregoing electrolyte precursor was subjected to heat treatment at 120° C. in vacuo, to obtain a powder. In the X-ray diffraction spectrum (FIG. 10) of the powder, a peak derived from LiBr that is the raw material was strongly observed.

INDUSTRIAL APPLICABILITY

In accordance with the production method of a solid electrolyte of the present embodiment, a crystalline solid electrolyte which is high in the ionic conductivity and excellent in the battery performance and is able to suppress the generation of hydrogen sulfide can be produced. The crystalline solid electrolyte obtained by the production method of the present embodiment is suitably used for batteries, especially batteries to be used for information-related instruments, communication instruments, and so on, such as personal computers, video cameras, and mobile phones.

The invention claimed is:

1. A production method of a solid electrolyte containing a lithium element, a sulfur element, a phosphorous element, and a halogen element, the method comprising:
mixing a complexing agent having an ester group and also having at least one branch with a solid electrolyte raw material, and drying to obtain an electrolyte precursor comprising the complexing agent, a lithium element, a sulfur element, a phosphorus element, and a halogen element;
heating the electrolyte precursor to obtain an amorphous solid electrolyte; and
heating the amorphous solid electrolyte in an inert gas atmosphere or a reduced pressure atmosphere to obtain a crystalline solid electrolyte,
wherein the crystalline solid electrolyte is in a form of particles, and wherein the halogen element comprises bromine and iodine.

2. The production method of a solid electrolyte according to claim 1, wherein the solid electrolyte contains a $PS_4^{3-}$ skeleton.

3. The production method of a solid electrolyte according to claim 1, wherein the solid electrolyte contains a thio-LISICON Region II-type crystal structure.

4. The production method of a solid electrolyte according to claim 3, wherein the solid electrolyte does not have diffraction peaks at $2\theta=17.5°$ and 26.1° in the X-ray diffractometry using a CuKα ray.

5. The production method of a solid electrolyte according to claim 1, wherein a boiling point of the complexing agent is 100° C. or higher.

6. The production method of a solid electrolyte according to claim 1, wherein the complexing agent is a compound represented by the following general formula (I):

$$R^{11}—X_{11}—R^{12}—X_{12}—R^{13} \tag{1}$$

wherein $X_{11}$ and $X_{12}$ are each independently a single bond, an ester group, or an ether group, and at least one of $X_{11}$ and $X_{12}$ is an ester group; $R^{11}$ and $R^{13}$ are each independently a hydrogen atom or a monovalent hydrocarbon group having 1 to 12 carbon atoms; $R^{12}$ is a single bond or a divalent hydrocarbon group having 1 to 12 carbon atoms; and at least one of $R^{11}$, $R^{12}$, and $R^{13}$ has a branch.

7. The production method of a solid electrolyte according to claim 1, wherein the complexing agent has an ester group and at least one selected from an ester group and an ether group, with a total of these groups being two or more.

8. The production method of a solid electrolyte according to claim 1, wherein the complexing agent has a methyl ether group.

9. The production method of a solid electrolyte according to claim 1, wherein the complexing agent is propylene glycol monomethyl ether acetate.

10. The production method of a solid electrolyte according to claim 1, wherein the complexing agent has a 2-propyl group in at least one end thereof.

11. The production method of a solid electrolyte according to claim 1, wherein the complexing agent is isobutyl isobutyrate.

12. The production method of a solid electrolyte according to claim 1, wherein the solid electrolyte raw material contains lithium sulfide and diphosphorus pentasulfide as raw materials.

13. The production method of a solid electrolyte according to claim 1, wherein the solid electrolyte raw material contains amorphous $Li_3PS_4$ or crystalline $Li_3PS_4$ as a raw material.

14. The production method of a solid electrolyte according to claim 1, comprising mixing the solid electrolyte raw material, the complexing agent, and a solvent that does not dissolve the electrolyte precursor.

15. The production method of a solid electrolyte according to claim 14, wherein the solvent is at least one solvent selected from an aliphatic hydrocarbon solvent, an alicyclic hydrocarbon solvent, an aromatic hydrocarbon solvent, and an ether-based solvent.

16. A production method of a solid electrolyte containing a lithium element, a sulfur element, a phosphorous element, and a halogen element, the method comprising:
mixing a complexing agent having an ester group and also having at least one branch with a solid electrolyte raw material, and drying to obtain an electrolyte precursor comprising the complexing agent, a lithium element, a sulfur element, a phosphorus element, and a halogen element;

heating the electrolyte precursor to obtain an amorphous solid electrolyte; and heating the amorphous solid electrolyte at a temperature of 130° C. to 300° C. in an inert gas atmosphere or a reduced pressure atmosphere to obtain a crystalline solid electrolyte, wherein the halogen element comprises bromine and iodine.

17. A production method of a solid electrolyte containing a lithium element, a sulfur element, a phosphorous element, and a halogen element, the method comprising:

mixing a complexing agent having an ester group and also having at least one branch with a solid electrolyte raw material, and drying to obtain an electrolyte precursor comprising the complexing agent, a lithium element, a sulfur element, a phosphorus element, and a halogen element, wherein a content of the solid electrolyte raw material is 5 g to 300 g relative to an amount of one liter of the complexing agent;

heating the electrolyte precursor to obtain an amorphous solid electrolyte; and heating the amorphous solid electrolyte in an inert gas atmosphere or a reduced pressure atmosphere to obtain a crystalline solid electrolyte, wherein the halogen element comprises bromine and iodine.

18. The production method of a solid electrolyte according to claim 1, wherein the mixing is performed at a temperature of –10° C. to 50° C.

\* \* \* \* \*